(12) United States Patent
Shen

(10) Patent No.: US 11,888,166 B2
(45) Date of Patent: Jan. 30, 2024

(54) GAS DIFFUSION LAYER, A PREPARATION METHOD THEREFOR, A MEMBRANE ELECTRODE ASSEMBLY AND A FUEL CELL

(71) Applicant: SHANGHAI JAZZ NEW MATERIAL TECHNOLOGY CO., LTD., Shanghai (CN)

(72) Inventor: Xinghan Shen, Shanghai (CN)

(73) Assignee: SHANGHAI JAZZ NEW MATERIAL TECHNOLOGY CO., LTD., Shanghai (CN)

(*) Notice: Subject to any disclaimer, the term of this patent is extended or adjusted under 35 U.S.C. 154(b) by 0 days.

(21) Appl. No.: 17/789,759

(22) PCT Filed: Dec. 28, 2020

(86) PCT No.: PCT/CN2020/139969
§ 371 (c)(1),
(2) Date: Aug. 1, 2022

(87) PCT Pub. No.: WO2021/136148
PCT Pub. Date: Jul. 8, 2021

(65) Prior Publication Data
US 2023/0045638 A1    Feb. 9, 2023

(30) Foreign Application Priority Data
Dec. 31, 2019  (CN) .......................... 201911414606.9

(51) Int. Cl.
*H01M 4/88* (2006.01)
*H01M 4/86* (2006.01)
*H01M 8/1004* (2016.01)

(52) U.S. Cl.
CPC ......... *H01M 4/8807* (2013.01); *H01M 4/861* (2013.01); *H01M 4/8657* (2013.01); *H01M 4/8885* (2013.01); *H01M 8/1004* (2013.01); *H01M 4/8821* (2013.01); *H01M 4/8835* (2013.01)

(58) Field of Classification Search
None
See application file for complete search history.

(56) References Cited

FOREIGN PATENT DOCUMENTS

| CN | 103066231 | * | 4/2013 |
| CN | 110148759 | * | 8/2019 |
| CN | 111584879 | * | 8/2020 |

\* cited by examiner

*Primary Examiner* — Jonathan Crepeau
(74) *Attorney, Agent, or Firm* — Javalon Law, PC

(57) ABSTRACT

A gas diffusion layer, a preparation method therefor, a membrane electrode assembly and a fuel cell. The gas diffusion layer comprises gas diffusion layer substrates (41, 42) and a microporous layer slurry coated on the gas diffusion layer substrates (41, 42). An additive that contains catechol or contains a catechol structure compound is specifically added into the microporous layer slurry, and the additive is specifically dopamine hydrochloride.

15 Claims, 3 Drawing Sheets

GAS DIFFUSION LAYER, A PREPARATION METHOD THEREFOR, A MEMBRANE ELECTRODE ASSEMBLY AND A FUEL CELL

TECHNICAL FIELD

The present invention relates to the technical field of fuel cells, and in particular, relates to a gas diffusion layer, a preparation method therefor, a membrane electrode assembly and a fuel cell.

BACKGROUND ART

As an alternative energy technology, fuel cells have attracted wide attention and continued research and development due to its features of easy start-up, high energy density, zero emission and high energy conversion efficiency, and have been widely used as power supply for automobiles, communication base stations, portable electric tools, etc. To be used as a commercial power supply system, fuel cells should have outstanding advantages such as a long service life and a high energy density, such as application in standby power supply, passenger cars, material transport vehicles, submarines, among others.

Proton exchange membrane fuel cell (PEMFC) is the most mature fuel cell that closes to commercial application most. The gas diffusion layer plays five main roles in the membrane electrode of a PEMFC: Firstly, it supports the proton exchange membrane and the catalyst layer; Secondly, it transmits the anode and cathode reaction gases in the flow field channels to the catalyst surface through molecular diffusion and Knudsen; Thirdly, it transmits electrons generated by the catalyst layer to the polar plate. Fourthly, the water produced by the catalyst layer is transmitted to the channel and discharged in time through capillary effect and concentration diffusion, etc. in the gas diffusion layer to avoid mass transfer polarization. Fifthly, sometimes, the gas diffusion layer takes on the function of catalyst layer attaching, i.e. applying the catalyst layer directly on the surface of the gas diffusion layer. The commonly used gas diffusion layer is made from carbon fibers. The base paper is prepared by wet papermaking or dry nonwoven fabric method, and then carbonized and graphitized to prepare the base paper for gas diffusion layer. As the surface of carbon fibers is hydrophilic or poorly hydrophobic, the water produced in the fuel cell or the water input will accumulate in the gas diffusion layer and be difficult to discharge, which will result in the reaction gas not being transmitted to the catalyst surface in time, thus causing serious mass transfer polarization, resulting in the degradation of battery performance.

According to the above description, it can be seen that how to ensure the gas transmission balance in the fuel cell to ensure the good performance of the fuel cell is an urgent problem to be solved in the field of fuel cells.

SUMMARY OF THE INVENTION

In order to solve the above problems, the technical solution of the present invention provides a gas diffusion layer, a preparation method therefor, a membrane electrode assembly and a fuel cell, which can ensure the gas transmission balance in the fuel cell.

To achieve the above aim, the present invention provides the following technical solution:

A gas diffusion layer for fuel cells, wherein an additive containing catechol or pyrocatechol compounds, especially dopamine hydrochloride, is added into the slurry used in the microporous layer treatment process of said gas diffusion layer.

In some examples, dopamine hydrochloride is added into the slurry used in the microporous layer treatment process of said gas diffusion layer.

In some examples, the slurry used in the preparation process of the microporous layer of said gas diffusion layer consists of a conductive material, a pore-forming agent, a hydrophobic agent, a dispersing agent, among others.

In some examples, the slurry used in the preparation process of the microporous layer of said gas diffusion layer contains a conductive material, a pore-forming agent, a hydrophobic agent, and a dispersing agent.

In some examples, said conductive material in the slurry used in the preparation process of the microporous layer of the gas diffusion layer is carbon black; in some examples, said pore-forming agent includes one or two of ammonium carbonate, ammonium oxalate and lithium carbonate; in some examples, said hydrophobic agent is PTFE aqueous dispersion added with an additive containing catechol or pyrocatechol compounds, which, in particular, is dopamine hydrochloride.

In some examples, the dispersing agent belongs to alcohol.

In some examples, the thickness of the gas diffusion layer is 10 μm~500 μm.

The present invention also discloses a preparation method for said gas diffusion layer, which includes the following steps: preparing microporous layer slurry which contains a conductive material, a pore-forming agent, a hydrophobic agent, and a dispersing agent, evenly mixed and dispersed; applying said microporous layer slurry on the gas diffusion layer substrate by direct coating or by screen printing after hydrophobic treatment of the substrate; and calcining the gas diffusion layer applied with said microporous layer slurry.

In some examples, dopamine hydrochloride is added into the slurry used in the microporous layer treatment process of said gas diffusion layer.

In some examples, the slurry used in the preparation process of the microporous layer of said gas diffusion layer contains a conductive material, a pore-forming agent, a hydrophobic agent, and a dispersing agent.

In some examples, said conductive material in the slurry used in the preparation process of the microporous layer of the gas diffusion layer is carbon black;

In some examples, said pore-forming agent comprises one or two of ammonium carbonate, ammonium oxalate, and lithium carbonate;

In some examples, said hydrophobic agent is PTFE aqueous dispersion added with an additive containing catechol or pyrocatechol compounds (in particular, dopamine hydrochloride).

In some examples, the dispersing agent belongs to alcohol.

In some examples, the thickness of the gas diffusion layer is 10 μm~500 μm.

The present invention also comprises a membrane electrode assembly, which is characterized in that the membrane electrode assembly comprises:

A cathode-side gas diffusion layer, a cathode-side catalyst layer, a proton exchange membrane, an anode-side catalyst layer and an anode-side gas diffusion layer which are sequentially laminated;

wherein said cathode-side gas diffusion layer is prepared by the gas diffusion layer microporous layer treatment process of the present invention, wherein said anode-side gas diffusion layer is prepared by the gas diffusion layer microporous layer treatment process of the present invention.

The present invention also discloses a fuel cell, characterized in that said fuel cell comprises:

a fuel cell stack comprising said membrane electrode assembly, a polar plate, a collector plate, an insulating plate, a sealing structure, and an end plate, among others.

BRIEF DESCRIPTION OF THE DRAWINGS

The drawings used in describing the examples or the prior art are briefed hereinafter to better understand the technical solution of the examples of the present invention or the prior art. It is apparent that the drawings in the following description only serve as some examples of the present invention. Those skilled in the field of art may make other drawings based on the provided drawings without contributing creative labor.

DETAILED DESCRIPTION OF THE INVENTION

Figure 1:
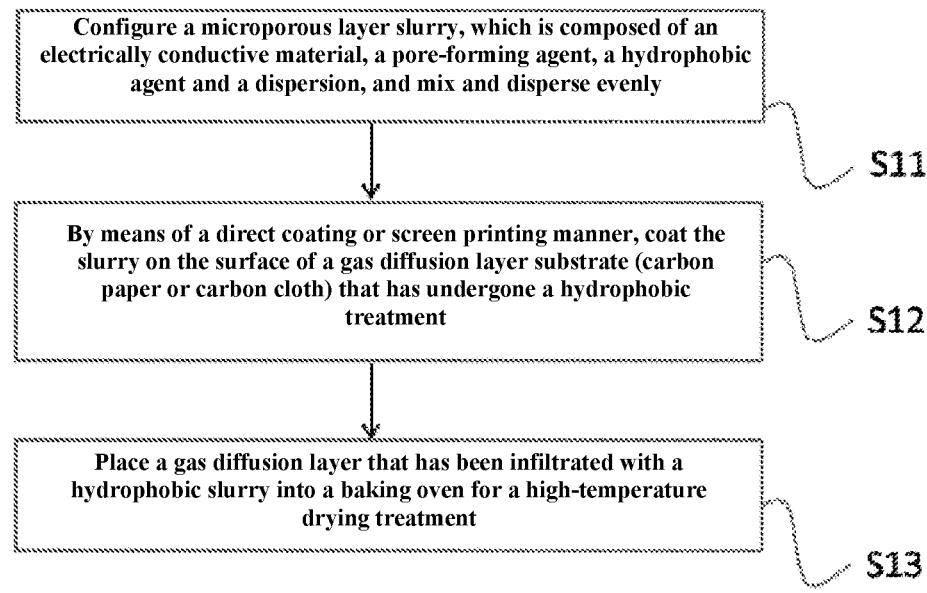
FIG. 1 is a flow chart of a preparation method provided according to an example of the present invention.

A clear and complete description will be given hereinafter to the technical solution of the embodiments of the present invention, in combination with the drawings of the embodiments. Obviously, the embodiments described are only part of but not all the embodiments of the present invention. Any other embodiments obtained by those skilled in the field based on the embodiments of the present invention without contributing creative labor are all within the protection scope of the present invention.

Generally, basic components of a proton exchange membrane fuel cell, or PEMFC include: polar plate, gas diffusion layer, catalyst layer, and proton exchange membrane.

A polar plate can be a unipolar plate and a bipolar plate, whose function is to isolate each single cell in the stack and deliver fuel and oxygen to the gas diffusion layer through its channels; besides, it also needs a relatively high conductivity to conduct current to the outside.

Gas diffusion layer, catalyst layer, and proton exchange membrane constitute the membrane electrode assembly. The gas diffusion layer, which is located between the catalyst layer and the polar plate, is one of the key materials in PEMFC and is the outermost layer of the membrane electrode assembly. It provides contact between the membrane electrode assembly and the polar plate, distributes reactants to the catalyst layer, and allows reaction products, i.e. water, to leave the electrode surface, allowing water to pass between the electrodes and flow channels.

Based on the above requirements, the gas diffusion layer maturely used in fuel cells at present is a porous carbon material, such as carbon paper (e.g. carbon fiber paper) or carbon cloth (e.g. carbon fiber cloth), applied with a microporous layer on the surface of its one side. In order to improve the transmission of reaction gas and liquid water in the gas diffusion layer, carbon paper or carbon cloth is usually subjected to hydrophobic treatment to construct a hydrophobic gas-phase channel.

Usually, a carbon powder layer is made on the surface of the gas diffusion layer to improve the porous structure. Its function is to reduce the contact resistance between the catalyst layer and the gas diffusion layer, provide better porous structure and hydrophobicity, redistribute gas and water, and prevent the electrode catalyst layer from being "flooded". The hydrophobic agent in the microporous layer and the capillary action of micropores give the microporous layer good hydrophobic and drainage properties, thus providing stable gas and water channels for reaction in the fuel cell, while the conductive carbon black in the microporous layer provides excellent channels for electrons in the microporous layer. Its addition realizes the redistribution of reaction gas and reaction product water between the flow field and the catalyst layer, and plays an important role in enhancing conductivity, improving electrode performance, strengthening cell operation stability, and prolonging service life.

The microporous layer structure of a conventional fuel cell comprises a microporous layer with high water-vapor permeability and a microporous layer with low water-vapor permeability, which are sequentially laminated in a direction perpendicular to the airflow path direction. Along the direction of the airflow path, the thickness of the microporous layer with high water-vapor permeability increases, and that of the microporous layer with low water vapor permeability decreases, with the total thickness of the microporous layer structure maintained the same.

However, the surface of hydrophilic carbon fibers is not easy to combine with hydrophobic polytetrafluoroethylene (PTFE) emulsion. Although the conventional slurry preparation method can solve the hydrophobicity problem of the gas diffusion layer material, PTFE is distributed unevenly on the surface of carbon fibers, and is easy to agglomerate. In particular, in the long-term operation of the fuel cell stack, especially the vehicle fuel cell stack, the operation condition is very complicated and severe, which requires tens of thousands of hours of operation life and tens of thousands of dry-wet cycles and thermal shocks. During the failure analysis of the membrane electrode as the core component of the fuel cell stack, a large gap is formed due to separation between the microporous layer and the substrate layer in the gas diffusion layer, causing liquid water to accumulate here, resulting in local flooding which blocks the diffusion of reaction gas to the catalyst surface, causing mass transfer polarization and local polarity reversal, and eventually resulting in the decrease of membrane electrode voltage or perforation failure. It is generally believed that when the fuel cell stack is below freezing point, the residual liquid water in the gas diffusion layer will freeze and expand in volume; When the temperature rises, the ice melts. After repeated cycles, the gap becomes larger and larger. Especially in the part where the microporous layer is in contact with the substrate layer, it is easier to accumulate liquid water because of the difference between the two materials, and therefore tends to fail first.

An additive containing catechol or pyrocatechol compounds which, in particular, is dopamine hydrochloride, is specially added into the microporous layer slurry selected in the present invention. The aromatic ring functional group in this kind of substance is a unit with π-π conjugated structure, which is similar to the carbon-carbon chemical bond structure on the surface of carbon fibers after high-temperature graphitization, and can be well contacted and dispersed. Meanwhile, the o-dihydroxy structure on the aromatic ring itself has good conductivity, which is conducive to the improvement of the conductivity of the microporous layer, and can be well contacted with PTFE molecular chain, and is also well miscible with alcohol solvents in PTFE solution. In particular, dopamine hydrochloride containing the catechol structure, with the functional group of amino acid structure, can further increase the combination with PTFE solution and carbon fibers. The functional group of amino acid structure will be naturally decomposed and released as produced gases in high-temperature treatment in a later process, and meanwhile, it is also a pore-forming agent, which can increase the porosity of the gas diffusion layer material. Actually, the understanding of the attachment ability of catechol groups comes from substances secreted by the tentacles of marine shellfish organisms whose tentacles can adhere to a variety of surfaces because of the presence of catechol groups in the adhesive proteins secreted by the tentacles. Compounds containing catechol groups can imitate the magical adhesion ability of shellfish, so that PTFE can attach tightly to the surface of carbon fibers in the gas diffusion layer.

To make the above-mentioned aims, features, and advantages of the present invention clearer and easier to understand, the present invention will be elaborated below with the drawings and detailed embodiments.

FIG. 1 is the flow chart of a preparation method of a fuel cell gas diffusion layer provided by an example of the present invention, as shown in FIG. 1, the preparation method comprises:

Step S11: Preparing a microporous layer slurry that consists of a conductive material, a pore-forming agent, a hydrophobic agent, and a dispersing agent evenly mixed and dispersed.

The conductive material is carbon black, preferably Vulcan XC-72(R) or Acetylene Black. The pore-forming agent includes one or two of ammonium carbonate, ammonium oxalate and lithium carbonate, preferably ammonium oxalate. The hydrophobic agent is PTFE aqueous dispersion added with an additive containing catechol or pyrocatechol compounds, which, in particular, is dopamine hydrochloride. The dispersing agent belongs to alcohols, which includes one or two of ethanol, isopropyl alcohol, and ethylene glycol, preferably isopropyl alcohol.

Step S12: applying the slurry on the surface of the gas diffusion layer substrate by direct coating or by screen printing after hydrophobic treatment of the substrate, wherein the substrate can be carbon paper or carbon cloth.

Step S13: calcining the gas diffusion layer applied with said microporous layer slurry in a drying oven.

In some examples, the microporous layer slurry used in Step S11 comprises a conductive material, a pore-forming agent, a hydrophobic agent, and a dispersing agent evenly mixed and dispersed.

Figure 2:
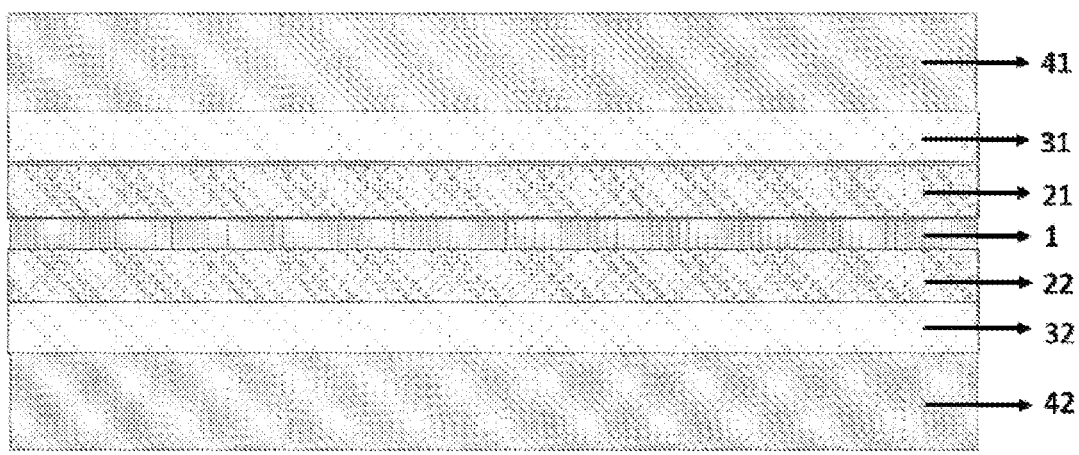
FIG. 2 is a structural schematic diagram of a membrane electrode assembly provided according to an example of the present invention.

Based on the above example, another example of the present invention also provides a membrane electrode assembly, as shown in FIG. 2, which is a description of each component of the fuel cell membrane electrode assembled by the gas diffusion layer prepared by the present invention: 1 denotes a proton exchange membrane, 21 denotes an anode catalyst layer, 31 denotes the microporous layer of an anode gas diffusion layer, 41 denotes the substrate part of the anode gas diffusion layer, 22 denotes an anode catalyst layer, 32 denotes the microporous layer of an anode gas diffusion layer, and 42 denotes the substrate part of the anode gas diffusion layer.

Based on the above example, another example of the present invention also provides a fuel cell, including said membrane electrode assembly described in the above example.

Combined with the following specific design parameters, the performance of the fuel cell (Sample I) with the microporous layer structure described in the technical solution of the present application is compared with that of the fuel cell (Sample II) prepared by the conventional technology.

Sample I: microporous layer structure prepared by the technical solution of the example of the present invention 1) Weigh 3.2 g of Vulcan XC-72(R), 60 ml of an aqueous solution containing 2.5 g of ammonium oxalate, 8 g of 20% PTFE dilute solution, and 0.08 g of dopamine hydrochloride, pour into a certain amount of isopropyl alcohol, and mix well to prepare a slurry with a viscosity of 300 cp;

2) Apply the above slurry on carbon paper (TorayH060 carbon paper) after hydrophobic treatment of the carbon paper;

3) Put the gas diffusion layer applied with the slurry into a Muffle furnace, heat up at a heating rate of 5° C./min, and finally calcine at 340° C. for 60 min. Wait for the furnace to cool down to room temperature, and take out the gas diffusion layer to complete the preparation of the microporous layer.

According to the following porosity test method of the microporous layer, the porosity of the gas diffusion layer prepared in this example is measured to be 53.1% and the thickness is 223 μm.

(2) Comparative example: a microporous layer structure prepared by a conventional technical solution 1) Weigh 3.2 g of Vulcan XC-72(R), 60 ml of aqueous solution containing 2.5 g of ammonium oxalate, and 8 g of 20% PTFE dilute solution, pour into a certain amount of isopropyl alcohol, and mix well to prepare a slurry with a viscosity of 300 cp;

2) Apply the above slurry on carbon paper (TorayH060 carbon paper) after hydrophobic treatment;

3) Put the gas diffusion layer applied with the slurry into a Muffle furnace, heat up at a heating rate of 5° C./min, and finally calcine at 340° C. for 60 min. Wait for the furnace to cool down to room temperature, and take out the gas diffusion layer to complete the preparation of the microporous layer.

According to the following porosity test method of the microporous layer, the porosity of this sample is measured to be 48.2% and the thickness is 219 μm.

In the example of the present invention, the impregnation method is adopted to measure the porosity of the microporous layer. Firstly, weigh the hydrophobically treated substrate layer of the gas diffusion layer with an area of a and a thickness of $b_1$ as $\varepsilon_1$, and soak it in decane until the weight is constant (decane is used as a wetting solution, which can enter all the holes of the substrate layer of the diffusion layer because of its low surface energy). Use the weighing method to determine the mass $\varepsilon_2$ of the diffusion layer before and after soaking. Then, weigh the prepared diffusion layer (including the substrate layer and the microporous layer) with the same area of a and thickness of $b_2$, as ε3, and soak it in decane until the weight is constant. Weigh the diffusion layer (including the substrate layer and the microporous layer) before and after soaking as ε4, and calculate the porosity φ of microporous layer using the formula below:

$$\varphi = \frac{\varepsilon_4 - \varepsilon_3 - (\varepsilon_2 - \varepsilon_1)}{(b_2 - b_1) * a * \rho_{Decane}} \times 100\%$$

Figure 3:
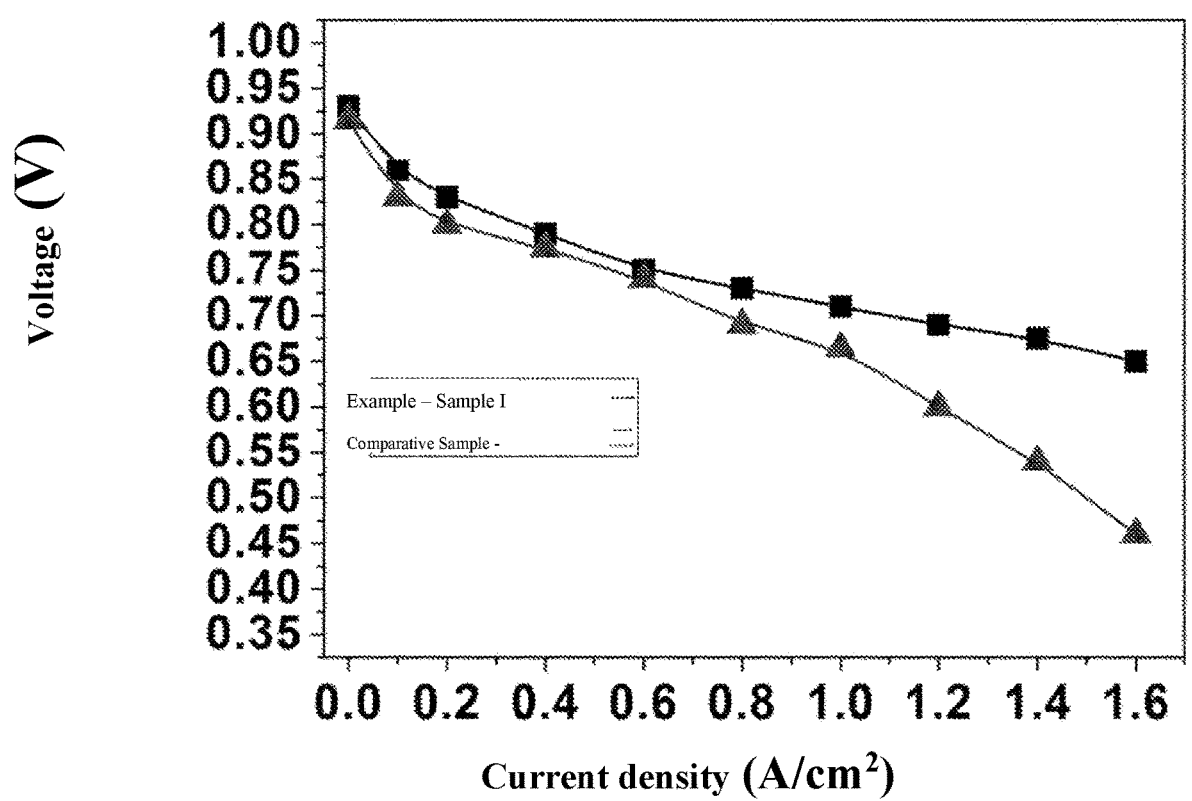
FIG. 3 is a diagram showing the comparison curves of the test performance result of a single cell prepared by an embodiment of the present invention and that of a single cell prepared using a traditional solution.

Assemble the above two samples into a PEMFC with an active area of 200 cm² respectively, wherein the assembly mode and the flow direction of the cathode and the anode gases of the gas diffusion layer prepared with Sample I are the same as shown in FIG. 3. Test and compare the electrochemical performance of the cells. The test environment of the data in FIG. 3 is: the cathode inlet pressure is the same as the anode inlet pressure, the anode inlet gas humidity is 50%, the cathode inlet gas humidity is 50%, and other operating conditions are the same. According to the result, when the electric density is above 1.0 A/cm², the voltage of the cell prepared with Sample I remains stable, but the voltage of the cell prepared with Sample II decreases obviously, resulting in mass transfer polarization. In FIG. 3, the horizontal axis represents current density, and the vertical axis represents voltage. It shows that the fuel cell prepared according to the technical solution of the present application has a relatively good self-humidifying effect and excellent battery performance.

The process conditions can be adjusted as required to form gas diffusion layers with different thicknesses. For example, the thickness of the gas diffusion layer obtained is between 10 μm to 500 μm.

The description of the disclosed examples above allows a person skilled in the art to implement or use the present invention. Various changes of these examples are obvious to those skilled in the art and the generic principles defined herein may be embodied in other examples without departing from the spirit or scope of the present invention. Therefore, the present invention will not be limited to the examples shown herein, but rather shall be in accordance with the broadest scope consistent with the principles and novel features disclosed herein.

The present invention can be realized by the following example:

1. A gas diffusion layer for fuel cells, characterized in that the gas diffusion layer comprises a gas diffusion layer substrate and a microporous layer slurry applied on the gas diffusion layer substrate, wherein an additive containing catechol or pyrocatechol compounds is added into the microporous layer slurry.

2. The gas diffusion layer of Example 1, characterized in that dopamine hydrochloride is added into the slurry used in the microporous layer treatment process of the gas diffusion layer.

3. The gas diffusion layer structure of Example 1, characterized in that the slurry used in the preparation process of the microporous layer of the gas diffusion layer contains a conductive material, a pore-forming agent, a hydrophobic agent, and a dispersing agent.

4. The gas diffusion layer structure of Example 1, characterized in that the slurry used in the preparation process of the microporous layer of the gas diffusion layer contains a conductive material which is carbon black.

5. The gas diffusion layer structure of Example 1, characterized in that the slurry used in the preparation process of the microporous layer of the gas diffusion layer contains a pore-forming agent which includes one or two of ammonium carbonate, ammonium oxalate and lithium carbonate.

6. The gas diffusion layer structure of Example 1, characterized in that the slurry used in the preparation process of the microporous layer of the gas diffusion layer contains a hydrophobic agent which is PTFE aqueous dispersion added with an additive containing catechol or pyrocatechol compounds.

7. The gas diffusion layer structure of Example 1, characterized in that the slurry used in the preparation process of the microporous layer of the gas diffusion layer contains a dispersing agent which belongs to alcohols.

8. The gas diffusion layer structure of Example 1, characterized in that the thickness of the gas diffusion layer is 10 μm~500 μm.

9. The gas diffusion layer structure of Example 1, characterized in that,

9. A preparation method for the gas diffusion layer of any one of Examples 1-8, characterized in that the method includes:

preparing microporous layer slurry which contains a conductive material, a pore-forming agent, a hydrophobic agent and a dispersing agent evenly mixed and dispersed;

applying the microporous layer slurry on the surface of the gas diffusion layer substrate by direct coating or by screen printing after hydrophobic treatment of the substrate; and calcining the gas diffusion layer applied with the microporous layer slurry.

10. The preparation method for gas diffusion layer of Example 9, characterized in that the substrate can be carbon paper or carbon cloth.

11. The preparation method of the gas diffusion layer of Example 9, characterized in that dopamine hydrochloride is added into the microporous layer slurry used in the gas diffusion layer.

12. The preparation method for gas diffusion layer of Example 9, characterized in that the microporous layer slurry used for the gas diffusion layer contains a conductive material, a pore-forming agent, a hydrophobic agent and a dispersing agent.

13. The preparation method for gas diffusion layer of Example 9, characterized in that the conductive material in the slurry used in the preparation process of the microporous layer of the gas diffusion layer is carbon black.

14. The preparation method for gas diffusion layer of Example 9, characterized in that the pore-forming agent includes one or two of ammonium carbonate, ammonium oxalate and lithium carbonate.

15. The preparation method for the gas diffusion layer of Example 9, characterized in that the hydrophobic agent is PTFE aqueous dispersion added with an additive containing catechol or pyrocatechol compounds 16. The preparation method for gas diffusion layer of Example 9, characterized in that the dispersing agent belongs to alcohols.

17. The preparation method of the gas diffusion layer of Example 15, characterized in that the additive containing pyrocatechol compound is dopamine hydrochloride.

18. The preparation method for gas diffusion layer of Example 9, characterized in that the thickness of the gas diffusion layer is 10 μm~500 μm.

19. A membrane electrode assembly, characterized in that the membrane electrode assembly comprises:

a cathode-side gas diffusion layer, a cathode-side catalyst layer, a proton exchange membrane, an anode-side catalyst layer and an anode-side gas diffusion layer which are sequentially laminated;

wherein the cathode-side gas diffusion layer comprises the microporous layer of the gas diffusion layer of any one of Examples 1 to 18; and the anode-side gas diffusion layer includes the gas diffusion layer of any one of Examples 1 to 18.

20. A fuel cell, characterized in that said fuel cell comprises:

a fuel cell stack comprising the membrane electrode assembly of Example 19, a polar plate, a collector plate, an insulating plate, a sealing structure and an end plate.

The invention claimed is:

1. A gas diffusion layer for fuel cells, the gas diffusion layer comprises a gas diffusion layer substrate and a microporous layer slurry applied directly or by screen printing on the gas diffusion layer substrate, wherein an additive containing catechol or pyrocatechol compounds is added into the microporous layer slurry; wherein the gas diffusion layer substrate applied with the microporous layer slurry is calcined to decompose and release functional groups of an amino acid structure in the additive to form a microporous layer on the surface of the gas diffusion layer substrate; wherein the slurry used in the preparation process of the microporous layer of the gas diffusion layer contains a conductive material, a pore-forming agent, a hydrophobic agent, and a dispersing agent.

2. The gas diffusion layer of claim 1, wherein dopamine hydrochloride is added into the slurry used in the microporous layer treatment process of the gas diffusion layer.

3. The gas diffusion layer of claim 1, wherein the slurry used in the preparation process of the microporous layer of the gas diffusion layer contains the pore-forming agent which includes one or two of ammonium carbonate, ammonium oxalate and lithium carbonate.

4. The gas diffusion layer of claim 1, wherein the slurry used in the preparation process of the microporous layer of the gas diffusion layer contains the hydrophobic agent which is PTFE aqueous dispersion added with an additive containing catechol or pyrocatechol compounds.

5. The gas diffusion layer of claim 1, wherein the slurry used in the preparation process of the microporous layer of the gas diffusion layer contains the dispersing agent which is alcohol.

6. The gas diffusion layer of claim 1, wherein the thickness of the gas diffusion layer is 10 μm~500 μm.

7. A method for preparing the gas diffusion layer of claim 1, wherein the method comprises: preparing the microporous layer slurry which contains the conductive material, the pore-forming agent, the hydrophobic agent and the dispersing agent evenly mixed and dispersed; applying the microporous layer slurry on the surface of the gas diffusion layer substrate by direct coating or by screen printing after hydrophobic treatment of the substrate; and calcining the gas diffusion layer substrate applied with the microporous layer slurry to decompose and release the functional groups of the amino acid structure in the additive.

8. The preparation method for gas diffusion layer of claim 7, wherein the substrate is carbon paper or carbon cloth.

9. The preparation method for gas diffusion layer of claim 7, wherein dopamine hydrochloride is added into the microporous layer slurry used in the gas diffusion layer.

10. The preparation method for gas diffusion layer of claim 7, wherein the conductive material in the slurry used in the preparation process of the microporous layer of the gas diffusion layer is carbon black.

11. The preparation method for gas diffusion layer of claim 7, wherein the pore-forming agent includes one or two of ammonium carbonate, ammonium oxalate and lithium carbonate.

12. The preparation method for gas diffusion layer of claim 7, wherein the hydrophobic agent is PTFE aqueous dispersion added with the additive containing catechol or pyrocatechol compounds.

13. The preparation method for gas diffusion layer of claim 7, wherein the dispersing agent is alcohol.

14. The preparation method for gas diffusion layer of claim 12, wherein the additive containing pyrocatechol compound is dopamine hydrochloride.

15. The preparation method for gas diffusion layer of claim 7, wherein the thickness of the gas diffusion layer is 10 μm~500 μm.

* * * * *